US012764592B2

(12) United States Patent
Henry et al.

(10) Patent No.: US 12,764,592 B2
(45) Date of Patent: Oct. 13, 2026

(54) SYSTEM FOR LOW LATENCY, LOW LOSS, AND SCALABLE THROUGHPUT (L4S) TRAFFIC MAPPING

(71) Applicant: Cisco Technology, Inc., San Jose, CA (US)

(72) Inventors: Jerome Henry, Pittsboro, NC (US); Binita Gupta, San Diego, CA (US); Juan Carlos Zuniga, Montreal (CA)

(73) Assignee: Cisco Technology, Inc., San Jose, CA (US)

( * ) Notice: Subject to any disclaimer, the term of this patent is extended or adjusted under 35 U.S.C. 154(b) by 190 days.

(21) Appl. No.: 18/595,219

(22) Filed: Mar. 4, 2024

(65) Prior Publication Data

US 2025/0203442 A1 Jun. 19, 2025

Related U.S. Application Data

(60) Provisional application No. 63/612,342, filed on Dec. 19, 2023.

(51) Int. Cl.

*H04W 28/02* (2009.01)
*H04L 47/20* (2022.01)
*H04W 84/12* (2009.01)

(52) U.S. Cl.

CPC ......... *H04W 28/0236* (2013.01); *H04L 47/20* (2013.01); *H04W 84/12* (2013.01)

(58) Field of Classification Search

CPC .... H04W 28/0236; H04W 84/12; H04L 47/20
See application file for complete search history.

(56) References Cited

U.S. PATENT DOCUMENTS 9,172,655 B1 * 10/2015 Dropps ............... H04L 47/6215
9,191,400 B1 * 11/2015 Ptasinski ................ H04L 69/22
(Continued)

FOREIGN PATENT DOCUMENTS

CN 109863733 * 2/2018
WO WO-2023111310 * 12/2022
(Continued)

OTHER PUBLICATIONS

You, Xin translation of CN 109863733 Feb. 8, 2018 (Year: 2018).*
(Continued)

*Primary Examiner* — Zaihan Jiang
(74) *Attorney, Agent, or Firm* — Rutan & Tucker, LLP; Ravi Mohan; Marc A. McClain

(57) ABSTRACT

Devices, networks, systems, methods, and processes for detecting and mapping Low Latency, Low Loss, and Scalable throughput (LAS) traffic are described herein. A device may determine that a data flow is LAS. The device can determine an initial Quality of Service (QoS) value associated with the data flow. The device may determine one or more network policies associated with one or more QoS levels. The device can determine a QoS ceiling value associated with a highest QoS level of the one or more QoS levels. The device may mark the data flow with the QoS ceiling value if the initial QoS value is lower than the QoS ceiling value, thereby mapping the data flow to the highest QoS level. The device can also maintain the initial QoS value if the initial QoS value is greater than the QoS ceiling value, as an exception to the one or more network policies.

20 Claims, 8 Drawing Sheets

(56) References Cited

U.S. PATENT DOCUMENTS

| | | | | |
|---|---|---|---|---|
| 9,356,857 | B1 * | 5/2016 | Narayanan | H04L 47/24 |
| 2010/0195558 | A1 * | 8/2010 | Koskinen | H04W 28/06 370/312 |
| 2012/0147767 | A1 * | 6/2012 | Yang | H04W 36/0044 370/252 |
| 2012/0250660 | A1 * | 10/2012 | Karlsson | H04W 76/10 370/332 |
| 2013/0067082 | A1 * | 3/2013 | Khan | H04L 12/413 709/225 |
| 2017/0111826 | A1 * | 4/2017 | Sankar | H04W 28/20 |
| 2023/0065081 | A1 * | 3/2023 | Mantha | H04W 76/12 |
| 2023/0254276 | A1 * | 8/2023 | Taylor | H04L 61/58 709/245 |
| 2025/0203442 | A1 * | 6/2025 | Henry | H04L 47/20 |

FOREIGN PATENT DOCUMENTS

| | | | |
|---|---|---|---|
| WO | 2023048628 A1 | | 3/2023 |
| WO | 2023088557 A1 | | 5/2023 |
| WO | 2023111310 A1 | | 6/2023 |
| WO | WO-2024038301 | * | 8/2023 |
| WO | WO-2025031335 | * | 8/2024 |

OTHER PUBLICATIONS

Lu, Yujiao translation of WO 2025031335 Aug. 6, 2024 (Year: 2024).*

Hervieu L., et al., "Low Latency QoS based on L4S", doc.: IEEE 802.11-23/0679r0, IEEE Draft 11-23-0679-00-0UHR-LOW-LATENCY-QOS-BASED-ON-L4S, IEEE-SA Mentor, Piscataway, NJ-USA, vol. 802.11 UHR, Jun. 5, 2023, pp. 1-17, XP068203596, Retrieved from https//mentor.ieee.org/802.11/dcn/23/11-23-0679-00-Ouhr-low-latency-qos-based-on-14s.pptx on Jun. 4, 2023, p. 6, p. 7, p. 10.

International Search Report and Written Opinion for International Application No. PCT/US2024/058731, mailed Mar. 18, 2025, 20 Pages.

IETF: "L4S Experimental Deployment", Jul. 2023, Retrieved from https://datatracker.ietf.org/meeting/117/materials/slides-117-tsvwg-81-14s-experience-00, pp. 1-5.

Mathieu B., et al., "Evaluating the L4S Architecture in Cellular Networks with a Programmable Switch", HAL Open Science, Apr. 11, 2023, 7 Pages.

Vaidya M., et al., "QoS Revisited", doc.: IEEE 802.11-23/0650r1, Apr. 2023, May 17, 2023, pp. 1-18.

* cited by examiner

SYSTEM FOR LOW LATENCY, LOW LOSS, AND SCALABLE THROUGHPUT (L4S) TRAFFIC MAPPING

CROSS-REFERENCE TO RELATED APPLICATION

This application claims the benefit of U.S. Provisional Patent Application No. 63/612,342, filed Dec. 19, 2023, which is incorporated by reference herein in its entirety.

The present disclosure relates to digital communication. More particularly, the present disclosure relates to Low Latency, Low Loss, and Scalable throughput (LAS) systems.

BACKGROUND

Digital communication networks involve communication between multiple interconnected devices. In real-time or near-real-time applications such as streaming video and playing multi-player games on the devices, latency of the communication is required to be minimal. For such applications, LAS provides low queuing latency, minimal congestion loss, and scalable throughput control. L4S aims to minimize time spent by data packets in queues, thereby reducing overall latency experienced by the applications. L4S also allows for efficiently managing congestion without causing loss of the data packets. Further, LAS provides scalable throughput, thereby allowing the communication networks to adapt to varying levels of demand from the devices.

For implementing Quality of Service (QoS) policies, the communication networks utilize Differentiated Services Code Point (DSCP) and User Priority (UP) fields in headers of the data packets. The DSCP fields in the headers allow classification and differentiation of different types of traffic, and the UP fields in the headers allow prioritization of the traffic. The devices in the communication networks can map or assign UP values to corresponding DSCP values to facilitate appropriate treatment for the data packets. The devices may also be configured to identify the DSCP and UP fields to schedule the data packets based on the corresponding DSCP and UP values. The utilization of DSCP and UP values facilitates establishment of QoS policies that can specify one or more actions that the devices must take for the data packets. For example, higher-priority traffic may be forwarded with minimal delay, while lower-priority traffic may experience some delay. The communication network may also implement traffic policing and shaping to enforce the QoS policies. For example, traffic policing may facilitate monitoring and controlling flow of the traffic, while traffic shaping can facilitate controlling a rate at which the traffic is sent. The enforcement of the QoS policies can also be performed by queue management. For example, the devices may set up different queues for handling the data packets with different DSCP or UP values to ensure that the higher-priority traffic is processed and forwarded before the lower-priority traffic. Further, the communication network can also monitor network performance and optimize the QoS policies as needed.

However, conventional communication networks are restricted by their maximum DSCP values that dictate a maximum QoS that any data traffic, including LAS traffic, can attain. This limits LAS performance in the conventional communication networks, and impacts coherency in LAS treatment across the devices in the communication network.

Therefore, there exists a need for a technique that seamlessly integrates the LAS treatment into the QoS policies of the communication network.

SUMMARY OF THE DISCLOSURE

Systems and methods for LAS throughput traffic mapping systems in accordance with embodiments of the disclosure are described herein. In some embodiments, a traffic mapping logic is configured to receive a data flow including at least one data packet, determine that the data flow is a Low Latency, Low Loss, Scalable throughput (LAS) data flow, identify an initial Quality of Service (QoS) value in at least one initial header of the at least one data packet, determine one or more network policies associated with the L4S data flow, and map one of the at least one data packet based on the initial QoS value and the one or more network policies.

In some embodiments, mapping each of the at least one data packet includes determining a maximum QoS value associated with the one or more network policies, comparing the initial QoS value with the maximum QoS value, generating at least one encapsulated data packet including at least one outer header based on a result of comparison, and mapping the data flow to at least one of a User Priority (UP) value or an Access Category (AC) value based on a result of the comparison.

In some embodiments, at least one outer header is indicative of the initial QoS value if the initial QoS value is greater than or equal to the maximum QoS value.

In some embodiments, at least one outer header is indicative of the maximum QoS value if the initial QoS value is less than the maximum QoS value.

In some embodiments the traffic mapping logic is further configured to replace the initial QoS value in the at least one initial header with the maximum QoS value if the initial QoS value is less than the maximum QoS value.

In some embodiments, the initial QoS value and the maximum QoS value are indicative of an initial Differentiated Services Code Point (DSCP) value and a maximum DSCP value respectively.

In some embodiments, the UP value or the AC value is indicative of one or more of AC Voice (AC_VO), AC Video (AC_VI) or AC Best Effort (AC_BE).

In some embodiments, determining that the data flow is the L4S data flow includes detecting an LAS indicator in the at least one data packet, and determining that the data flow is the LAS data flow based on the L4S indicator.

In some embodiments, the L4S indicator includes an Explicit Congestion Notification (ECN) indicator.

In some embodiments, the traffic mapping logic is further configured to enqueue the L4S data flow into an LAS queue.

In some embodiments, a traffic mapping logic is configured to receive a data flow, determine that the data flow is a Low Latency, Low Loss, Scalable throughput (LAS) data flow, identify a highest Quality of Service (QoS) level if the data flow is the L4S data flow, and map the L4S data flow to the highest QoS level.

In some embodiments the traffic mapping logic is further configured to enqueue the L4S data flow into a queue associated with the highest QoS level.

In some embodiments, determining that the data flow is the L4S data flow includes receiving at least one data packet of the data flow, detecting an LAS indicator in the at least one data packet, and determining that the data flow is the LAS data flow based on the L4S indicator.

In some embodiments, the traffic mapping logic is further configured to generate at least one encapsulated data packet including at least one outer header indicative of the highest QoS level.

In some embodiments, the LAS indicator includes an Explicit Congestion Notification (ECN) indicator.

In some embodiments, the data flow is an upstream data flow received from a wireless device.

In some embodiments, the traffic mapping logic is further configured to transmit, to the wireless device, a Stream Classification Service (SCS) signal indicative of marking the upstream data flow with the highest QoS level.

In some embodiments, a data flow including at least one data packet is received, a determination is made whether the data flow is a Low Latency, Low Loss, Scalable throughput (L4S) data flow, an initial Quality of Service (QoS) value in at least one initial header of the at least one data packet is identified, one or more network policies associated with the LAS data flow is determined, a maximum QoS value associated with the one or more network policies is determined, and at least one encapsulated data packet including at least one outer header based on the initial QoS value and the maximum QoS value is generated.

In some embodiments, at least one outer header is indicative of the initial QoS value if the initial QoS value is greater than or equal to the maximum QoS value.

In some embodiments, the at least one outer header is indicative of the maximum QoS value if the initial QoS value is less than the maximum QoS value.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
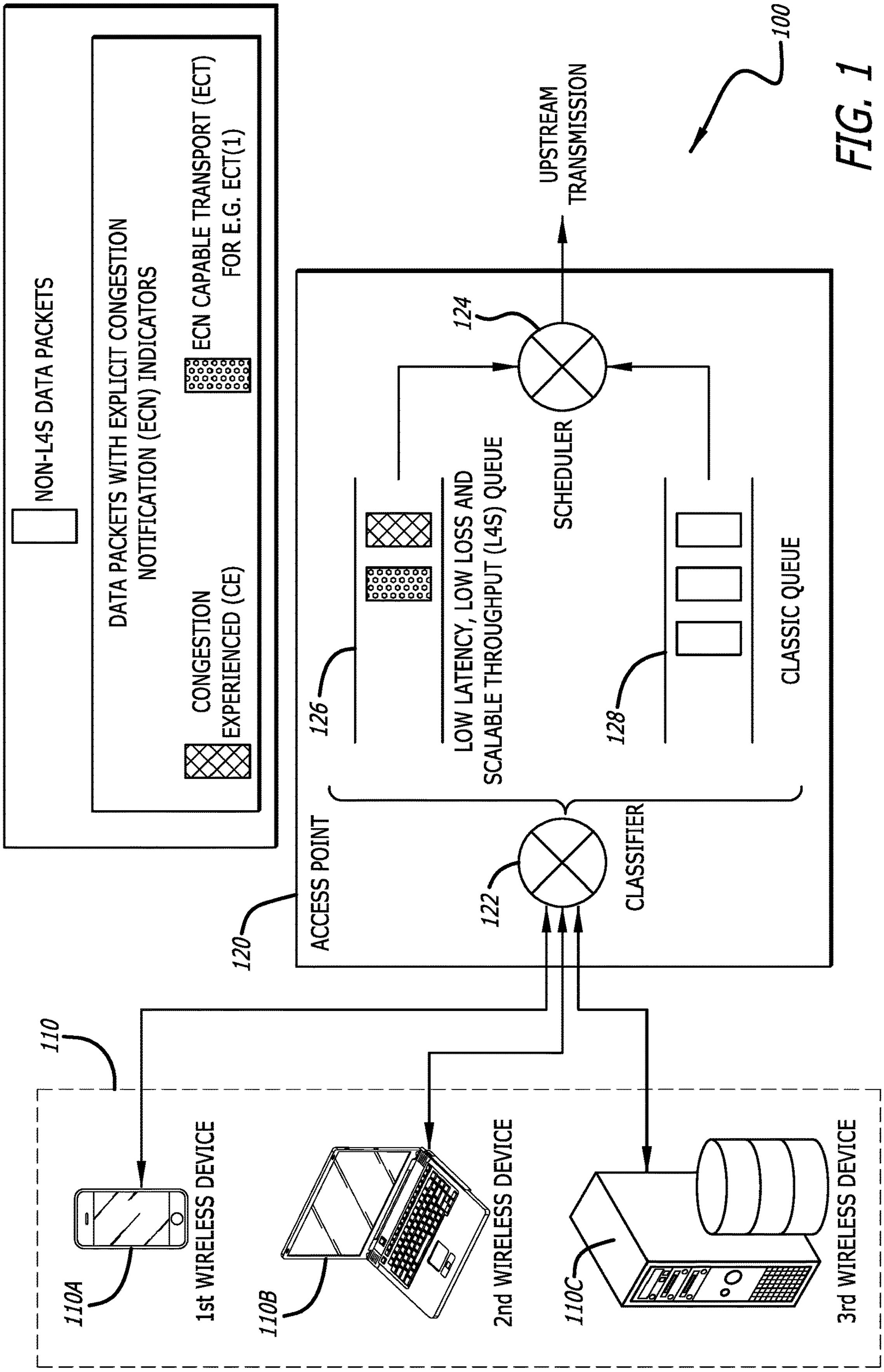
FIG. 1 is a conceptual illustration of a wireless communication network, in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that identify and map Low Latency, Low Loss, and Scalable throughput (LAS) data flows in a communication network. In many embodiments, the present disclosure integrates LAS treatment for L4S data flows in enterprise Wireless Local Area Network (WLAN) Quality of Service (QoS) policies. One or more QoS policies can be configured on the WLAN by an operator. The one or more QoS policies may define traffic classification, priority levels, bandwidth allocation, traffic policing and shaping, redirection and forwarding, or congestion management, etc. for example. The one or more QoS policies can be defined according to one or more requirements of the WLAN. In some embodiments, the QoS policies may include QoS ceiling values, such as but not limited to, maximum Differentiated Services Code Point (DSCP) values, maximum User Priority (UP) values, highest Access Category (AC) value, or Traffic Identifier (TID) values, for example. These QoS ceiling values may indicate a highest QoS level or a maximum QoS value for data flows, i.e., traffic flowing through the WLAN. QoS values may be included in headers of one or more data packets in a data flow. In certain embodiments, for example, a DSCP ceiling value may be set to prioritize certain types of the traffic based on corresponding DSCP values, or UP/TID ceilings values can be set to control a priority of the traffic based on corresponding user priority or traffic identifiers. The WLAN may be configured to operate with the one or more QoS policies at any time, and the same or different QoS ceiling values can be utilized in the one or more QoS policies.

In a number of embodiments, a device, such as but not limited to an Access Point (AP) or a WLAN controller (WLC) for example, may receive an LAS data flow. In some embodiments, the device can receive the data flow and determine the data flow to be LAS. In that, the device may detect or identify an Explicit Congestion Notification (ECN) indicator in a header of a data packet in the data flow. In certain embodiments, the ECN indicator may be utilized for signaling congestion between endpoints and/or signaling that the data flow should be treated as LAS. Examples of the ECN indicators include but are not limited to, Congestion Experienced (CE) or ECN Capable Transport (ECT) which can further include ECT(1) and/or ECT(0). The device can thereafter determine that the data flow is the LAS data flow based on the ECN indicator.

In various embodiments, upon receiving a downstream LAS data flow, the device can determine the QoS policy configured in the communication network. The device may determine a maximum QoS value in the determined QoS policy. The device can thereafter map the downstream LAS data flow to the maximum QoS value. In some embodiments, for example, if the QoS policy allows a maximum DSCP value of Assured Forwarding Class 4 (AF41) and a corresponding maximum UP value of UP (5), the device can map the downstream LAS data flow to DSCP (AF41) and UP (5). In certain embodiments, the communication network may be configured with one or more metal policies, such as but not limited to gold, silver, or bronze, for example, each having different maximum DSCP and UP values. In this case, when the device receives the downstream L4S data flow or when the device determines the downstream data flow to be LAS, the device may map the downstream LAS data flow to a maximum DSCP value associated with the highest QoS level. In more examples, for example, the device can map the downstream LAS data flow to DSCP (AF41) and UP (5), which may be the maximum QoS values corresponding to gold, which may be the highest QoS level configured in the communication network. Thereafter, the device can enqueue the downstream LAS data flow in an LAS queue. In some more embodiments, for example, the L4S queue may be an Active Queue Management (AQM) queue that can proactively respond to the congestion between the endpoints by marking the data packets. In numerous embodiments, the device may provide similar L4S treatment to upstream LAS data flows or upstream data flows that are determined to be LAS. Thus, the communication network can map the LAS data flows to the highest QoS level, thereby ensuring that the LAS data flows are placed in the LAS queues associated with a higher priority.

In additional embodiments, the device can receive the downstream LAS data flow and parse one or more data packets in the downstream L4S data flow. In some embodiments, for example, the data packets may comprise initial QoS values in corresponding fields in initial headers of the data packets. The device may compare the initial QoS value with the maximum QoS value. If the device determines that the initial QoS value is less than the maximum QoS value associated with the highest QoS level, the device can elevate the initial QoS value of the downstream LAS data flow to the maximum QoS value corresponding to the highest QoS level. That is, in certain embodiments, for example, if the downstream L4S data flow is initially assigned to a lower DSCP value, the device may reassign the downstream LAS data flow to the maximum DSCP value and/or the maximum UP value based on the one or more QoS policies. In some more embodiments, the device may map the data flow to at least one of: the UP value or the AC value based on a result of the comparison. In many more embodiments, for example, the UP value or the AC value is indicative of one or more of: AC Voice (AC_VO), AC Video (AC_VI) or AC Best Effort (AC_BE). In numerous embodiments, the device may provide similar LAS treatment to the upstream LAS data flows or the upstream data flows that are determined to be LAS. Thus, the communication network can effectively provide the L4S treatment to the L4S data flows that are initially assigned to lower QoS levels by reassigning the LAS data flows to the highest QoS level.

In further embodiments, the device may encapsulate one or more data packets of the L4S data flows to generate one or more encapsulated data packets. A data packet of the one or more data packets may include the initial QoS value in an initial header and a corresponding encapsulated data packet may include a reassigned QoS value in an outer header. In some embodiments, the device can replace the initial QoS value in the initial header with the reassigned QoS value. In certain embodiments, for example, if the device comprises an Internetworking Operating System (IOS) controller, the device may override the initial DSCP value in the initial header. In some more embodiments, the device can maintain the initial QoS value in the initial header. In more embodiments, for example, if the device comprises AireOS controller, the device may not override the initial DSCP value in the initial header. Thus, the communication system may provide flexibility in elevating the QoS values of the LAS data flows, and thereby providing the L4S treatment corresponding to the highest QoS level, with or without modifying the initial QoS values.

In many more embodiments, the device can receive the upstream LAS data flow or may determine the upstream data flow to be LAS. The device can map the upstream LAS data flow to the highest QoS level configured in the communication network. In some embodiments, for example, the if the highest QoS level corresponds to the metal policy of gold, with the maximum QoS value AF41, the device can assign or reassign the upstream LAS data flow as AF41 even if the upstream LAS data flow was initially indicative of a lower QoS value.

In many additional embodiments, the device may be configured with an LAS exception. In that, the device can treat the LAS data flows differently than non-L4S data flows. That is, while comparing the initial QoS value and the maximum QoS value, if the device determines that the initial QoS value is greater than the maximum QoS value, the device may maintain the initial QoS value in the initial header as well as in the outer header of the corresponding encapsulated data packet. In some embodiments, for example, the non-LAS data flows indicative of the initial QoS value that is higher than the maximum QoS value associated with the highest QoS level may be capped to the maximum QoS value, whereas the LAS data flows indicative of the initial QoS value that is higher than the maximum QoS value associated with the highest QoS level may be maintained with the initial QoS value, as an exception to a mapping defined by the QoS policies. In certain embodiments, for example, the communication network can treat the upstream L4S data flows as DSCP value of Expedited Forwarding (EF) or UP value of UP (6) between the AP and the WLC, as an exception to the QoS policy of gold which has the maximum QoS value of AF41. In more embodiments, for example, the upstream data flow that is determined to be LAS may be assigned the QoS value of DSCP 46, i.e., EF corresponding to UP (6), as an exception to the QoS policy of gold which has the maximum QoS value of AF41. These assigned or reassigned QoS values may further be maintained throughout the WLAN to ensure continued prioritized treatment for the LAS data flows.

In many further embodiments, the device may require a wireless device such as but not limited to a wireless station, to mark the upstream LAS data flow with a predetermined QoS value, such as but not limited to UP (6). In that, in some embodiments, the device may not change or modify the DSCP value. In operation, the device can transmit a Stream Classification Service (SCS) signal to the wireless device to override the initially assigned UP value. In response to the SCS signal, for example, the wireless device may mark the upstream LAS data flow as UP (6). The device can thereafter enqueue the upstream LAS data flow into the L4S queue having lowest latency.

Advantageously, the integration of the LAS treatment into the QoS policies of the WLAN can allow consistent and effective management of the L4S data flows. This may provide uniform QoS for the L4S data flows throughout the WLAN. The LAS data flows in the WLAN can be either at the QoS ceiling values or greater than the QoS ceiling values, thereby ensuring that the LAS data flows receive efficient LAS treatment in the WLAN. The integration of the LAS treatment may provide flexibility in managing the L4S data flows, ensuring that the WLAN can adapt to varying demands and requirements. Consistently and effectively managing the LAS data flows can further contribute to an enhanced user experience. The real-time and/or near-real time applications that require low latency and minimal packet loss may benefit from the integrated LAS treatment provided by the QoS policies in the WLAN.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system.". Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C.". An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a conceptual illustration of a wireless communication network 100, in accordance with various embodiments of the disclosure is shown. In many embodiments, the wireless communication network 100 may include a plurality of wireless devices 110 including first through third wireless devices 110A, 110B, and 110C. The examples of the wireless devices 110 may include but are not limited to smartphones, computers, laptops, network devices, or any other electronic devices, etc. The wireless devices 110 may be in communication with an Access Point (AP) 120. In that, the wireless devices 110 may be in communication with the AP 120 wirelessly by way of Wi-Fi. The wireless communication network 100 may utilize 6 GHz, 5 GHZ or 2.4 GHz bands or Millimeter Waves (mmWave) frequencies, for example. Some of the wireless devices 110 may be LAS enabled wireless devices 110. The AP 120 may also be LAS enabled. The AP 120 may implement a dual queue, viz., an Active Queue Management (AQM) queue for LAS data flows, i.e., an LAS queue 126 and a classic queue 128 for non-LAS data flows. The AP 120 can further include a scheduler 124 to schedule the incoming data flows based on whether the incoming data flows are L4S or non-LAS. In certain embodiments, the scheduler 124 may be a conditional priority scheduler that can prioritize the L4S data flows over the non-LAS data flows. Accordingly, the AP 120 may receive the incoming data flows and transmit the incoming data flows based on whether the data flows qualify for L4S treatment or whether the data flows are non-L4S data flows.

In a number of embodiments, one of the LAS enabled wireless devices 110 can initiate an upstream data flow. If the upstream data flow is marked as LAS, the AP 120 may enqueue the upstream data flow in the L4S queue 126. If the upstream data flow is not marked as LAS, the AP 120 may receive a plurality of upstream data packets in the upstream data flow. The AP 120 may parse the upstream data packets to determine whether any upstream data packet includes a congestion indicator. In some embodiments, the congestion indicator may be an Explicit Congestion Notification (ECN) indicator. Upon detecting the ECN indicator in one of the upstream data packets, the AP 120 can treat the upstream data flow as an upstream LAS data flow. In some embodiments, the ECN indicator may be an ECN Capable Transport (ECT) value or a Congestion Experienced (CE) value, for example. In certain embodiments, the ECT value of ECT(1) may be classified as LAS, for example.

Although a specific embodiment for the wireless communication network 100 for carrying out the various steps, processes, methods, and operations described herein is discussed with respect to FIG. 1, any of a variety of systems and/or processes may be utilized in accordance with embodiments of the disclosure. For example, the AP 120 may dynamically identify and mark the upstream data flows as LAS. The elements depicted in FIG. 1 may also be interchangeable with other elements of FIGS. 2-8 as required to realize a particularly desired embodiment.

Figure 2:
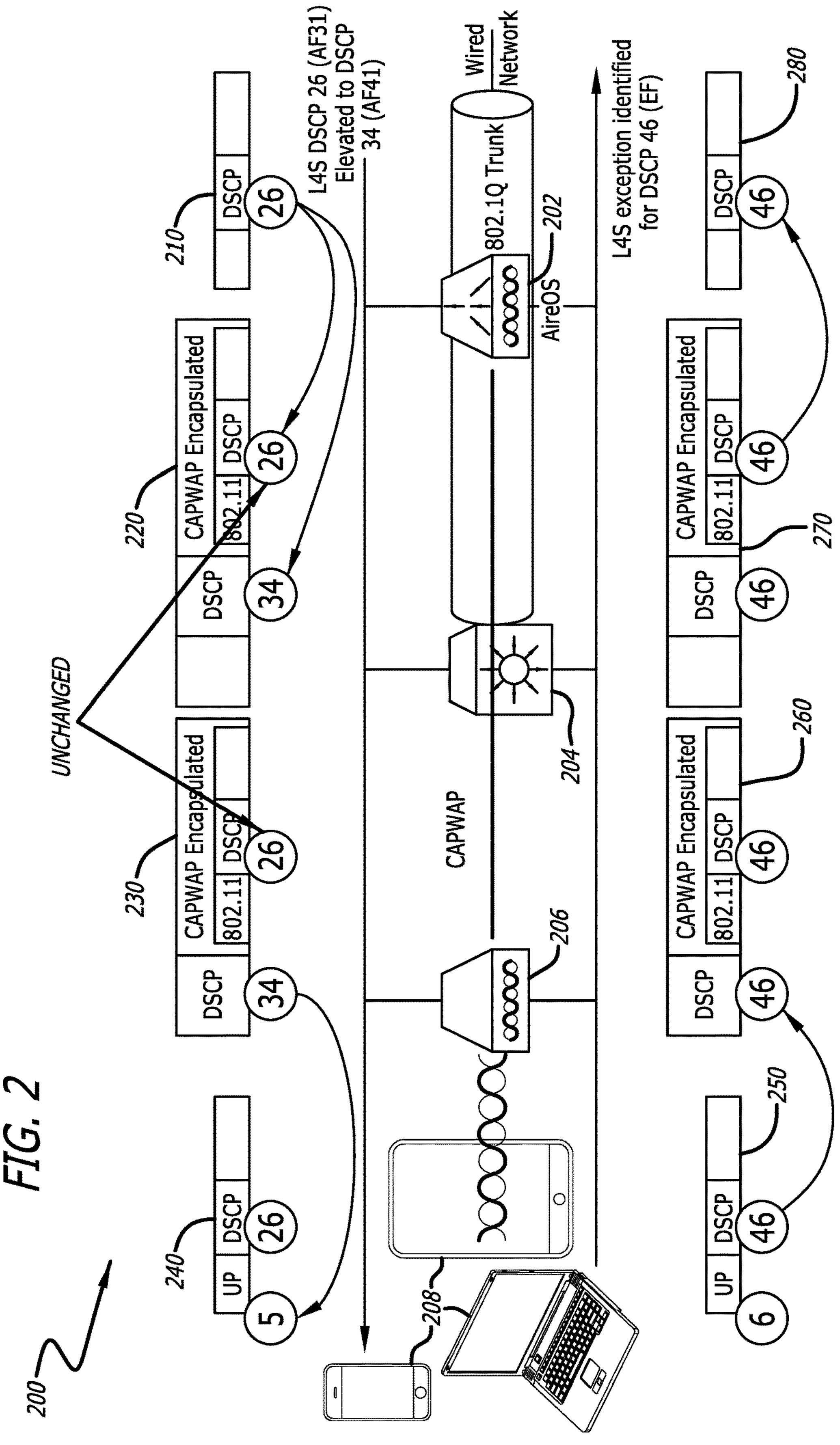
FIG. 2 is a conceptual illustration of encapsulation in a wireless communication network, in accordance with various embodiments of the disclosure.

Referring to FIG. 2, a conceptual illustration of encapsulation in a wireless communication network 200, in accordance with various embodiments of the disclosure is shown. In many embodiments, the wireless communication network 200 may be a Wireless Local Area Network (WLAN). The wireless communication network 200 can include a WLAN Controller (WLC) 202, a network device 204, and an AP 206. The AP 206 may be in communication with a user device 208. In some embodiments, the WLC 202 may comprise an AireOS controller.

In a number of embodiments, in downstream, a data flow from one or more endpoints, such as but not limited to web servers for example, may be addressed to an Internet Protocol (IP) address of the user device 208. The data flow may be routed to the WLC 202. The data flow may comprise one or more data packets including a data packet 210. The WLC 202 can receive the data packet 210. The data packet 210 may be an Ethernet frame including a payload, an initial header comprising a Differentiated Services Code Point (DSCP) value of DSCP 26 associated with Assured Forwarding Class 3 (AF31), and an 802.1q tag, i.e., a Virtual LAN (VLAN) tag. The 802.1q tag may include a priority value, for example, a 3-bit User Priority (UP) value, indicative of Quality of Service (QoS). The data packet 210 may be marked as L4S or the WLC 202 can determine that the data packet 210 is LAS. Thereafter, the WLC 202 may determine a maximum DSCP value associated with a highest QoS level based on one or more QoS policies configured in the wireless communication network 200. The WLC 202 can thereafter encapsulate the data packet 210 to generate an encapsulated data packet 220. In some embodiments, for example, the WLC 202 may utilize a Control and Provisioning of Wireless Access Points (CAPWAP) encapsulation to communicate with the AP 206. The encapsulated data packet 220 may include an outer header, for example, a CAPWAP header indicative of the maximum DSCP value assigned by the WLC 202 and 802.1p value indicative of the UP. The network device 204 may receive the encapsulated data packet 220 and transmit a data packet 230 to the AP 206 with LAS treatment. The AP 206 can strip the CAPWAP header and provide a Wi-Fi frame 240 to the user device 208 wirelessly.

In various embodiments, in upstream, the user device 208 may transmit an upstream data flow including a Wi-Fi frame 250 to the AP 206. The Wi-Fi frame may include a DSCP value and a UP value. The AP 206 can determine that the Wi-Fi frame 250 is LAS with the DSCP value of DSCP 46 associated with Expedited Forwarding (EF). As an exception to the one or more QoS policies of the wireless communication network 200, the AP 206 may maintain the DSCP value of DSCP 46 without capping to DSCP 34 which may be the maximum QoS value associated with the highest QoS level of the wireless communication network 200. This may ensure efficient LAS treatment for the upstream data flow. The AP 206 can forward the Wi-Fi frame to the WLC 202 through a CAPWAP tunnel. In that, the AP 206 may generate an encapsulated data packet 260. The network device 204 may receive the encapsulated data packet 260 and transmit a data packet 270 to the WLC 202. The WLC 202 may then transmit an Ethernet frame 280 to the endpoints, such as but not limited to the web servers for example.

Although a specific embodiment for the encapsulation in the wireless communication network 200 for carrying out the various steps, processes, methods, and operations described herein is discussed with respect to FIG. 2, any of a variety of systems and/or processes may be utilized in accordance with embodiments of the disclosure. For example, the wireless communication network 200 may provide the LAS treatment to the data flows without modifying the initial DSCP values of the data flows. The elements depicted in FIG. 2 may also be interchangeable with other elements of FIG. 1 and FIGS. 3-8 as required to realize a particularly desired embodiment.

Figure 3:
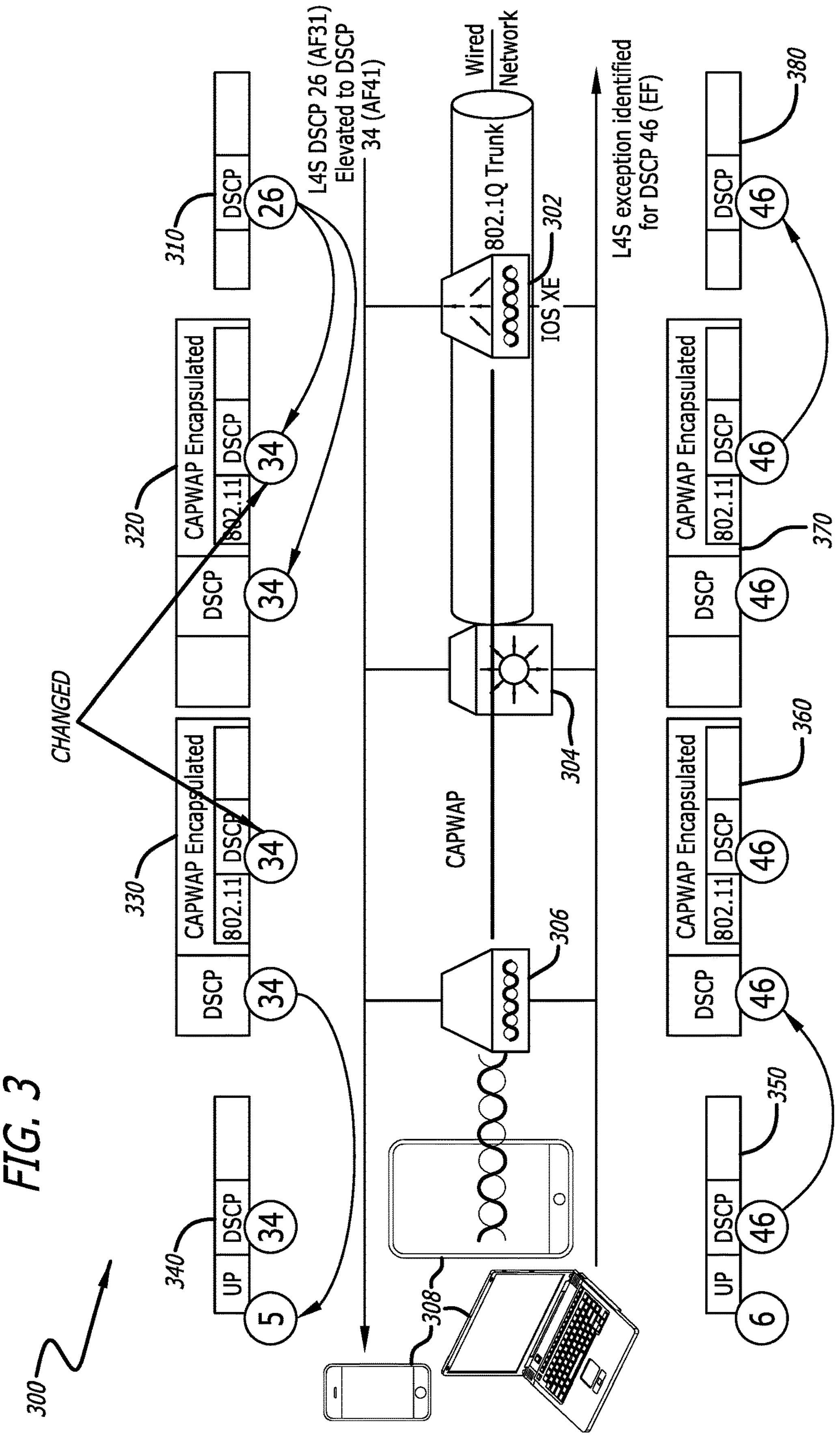
FIG. 3 is a conceptual illustration of encapsulation in a wireless communication network, in accordance with various embodiments of the disclosure.

Referring to FIG. 3, a conceptual illustration of encapsulation in a wireless communication network 300, in accordance with various embodiments of the disclosure is shown. In many embodiments, the wireless communication network 300 may be the WLAN. The wireless communication network 300 can include a WLC 302, a network device 304, and an AP 306. The AP 306 may be in communication with a user device 308. In some embodiments, the WLC 302 may comprise an Internetworking Operating System (IOS) controller.

In a number of embodiments, the WLC 302 can receive a data packet 310. The data packet 310 may be the Ethernet frame including the payload, the initial header comprising the DSCP value of DSCP 26 associated with AF31, and the 802.1q tag. The data packet 310 may be marked as LAS or the WLC 302 can determine that the data packet 310 is LAS. Thereafter, the WLC 302 may determine the maximum DSCP value associated with the highest QoS level based on the one or more QoS policies configured for the wireless communication network 300. The WLC 302 can thereafter encapsulate the data packet 310 to generate an encapsulated data packet 320. The encapsulated data packet 320 may include the outer header, for example, the CAPWAP header indicative of the maximum DSCP value assigned by the WLC 302 and 802.1p value indicative of the UP. The WLC 302 can further modify the initial header to include the maximum DSCP value. The network device 304 may receive the encapsulated data packet 320 and transmit a data packet 330 to the AP 306 with LAS treatment. The AP 306 can strip the CAPWAP header and provide a Wi-Fi frame 340 to the user device 308 wirelessly.

In various embodiments, in upstream, the user device 308 may transmit the upstream data flow including a Wi-Fi frame 350 to the AP 306. The Wi-Fi frame may include the DSCP value and the UP value. The AP 306 can determine that the Wi-Fi frame 350 is LAS with the DSCP value of DSCP 46 associated with EF. As an exception to the one or more QoS policies of the wireless communication network 300, the AP 306 may maintain the DSCP value of DSCP 46 without capping to DSCP 34 which may be the maximum QoS value associated with the highest QoS level of the wireless communication network 300. This may ensure efficient LAS treatment for the upstream data flow. The AP 306 can forward the Wi-Fi frame to the WLC 302 through the CAPWAP tunnel. In that, the AP 306 may generate an encapsulated data packet 360. The network device 304 may receive the encapsulated data packet 360 and transmit a data packet 370 to the WLC 302. The WLC 302 may then transmit an Ethernet frame 380 to the endpoints, such as but not limited to the web servers for example.

Although a specific embodiment for the encapsulation in the wireless communication network 300 for carrying out the various steps, processes, methods, and operations described herein is discussed with respect to FIG. 3, any of a variety of systems and/or processes may be utilized in accordance with embodiments of the disclosure. For example, the wireless communication network 300 may provide the L4S treatment to the data flows and also modify the initial DSCP values of the data flows. The elements depicted in FIG. 3 may also be interchangeable with other elements of FIGS. 1-2 and FIGS. 4-8 as required to realize a particularly desired embodiment.

Figure 4:
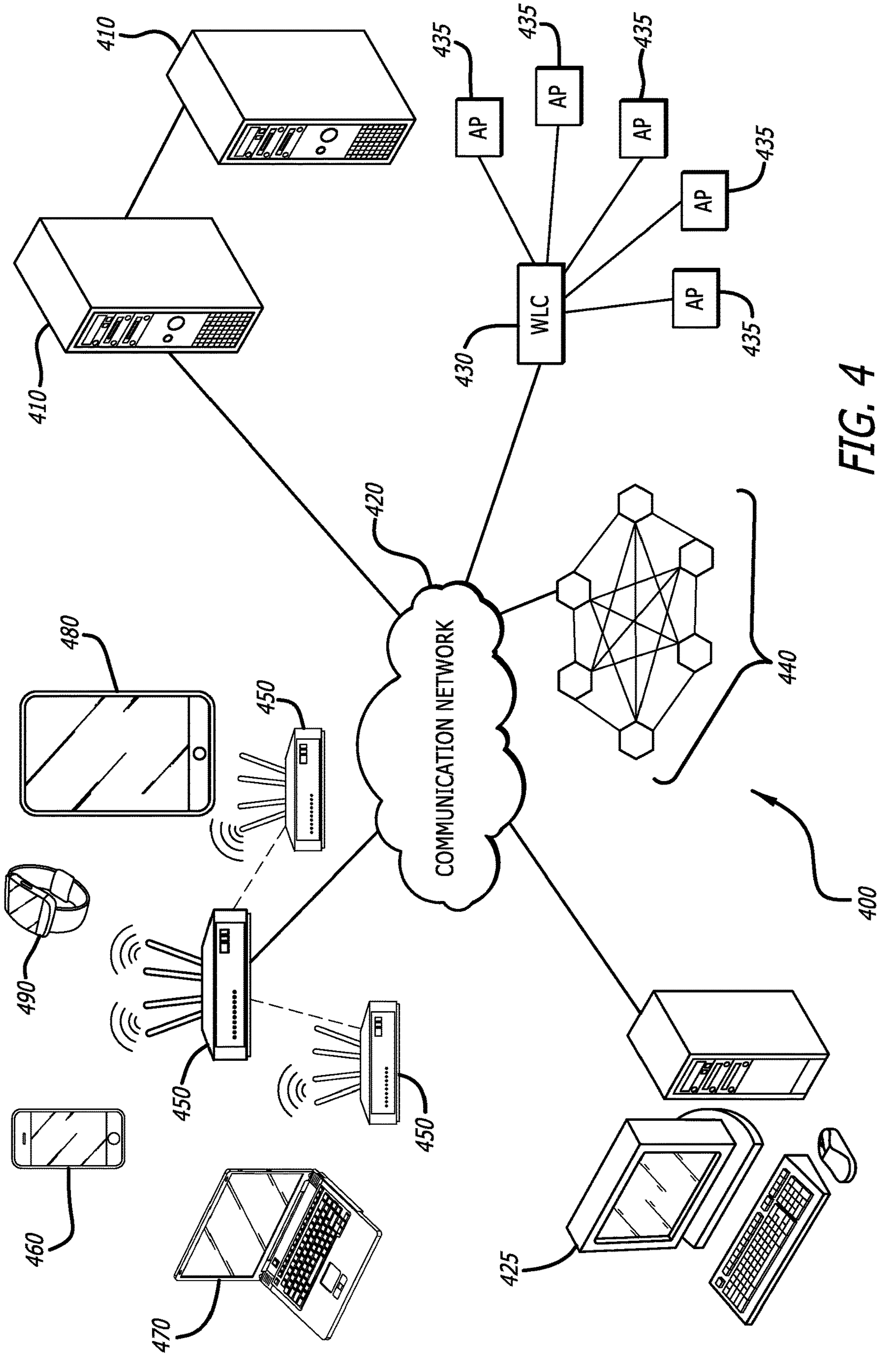
FIG. 4 is a conceptual network diagram of various environments that a traffic manager may operate on a plurality of network devices, in accordance with various embodiments of the disclosure.

Referring to FIG. 4, a conceptual network diagram 400 of various environments that a traffic manager may operate on a plurality of network devices, in accordance with various embodiments of the disclosure is shown. Those skilled in the art will recognize that the traffic manager can be comprised of various hardware and/or software deployments and can be configured in a variety of ways. In many embodiments, the traffic manager can be configured as a standalone device, exist as a logic in another network device, be distributed among various network devices operating in tandem, or remotely operated as part of a cloud-based network management tool. In further embodiments, one or more servers 410 can be configured with or otherwise operate the traffic manager. In many embodiments, the traffic manager may operate on one or more servers 410 connected to a communication network 420. The communication network 420 can include wired networks or wireless networks. In many embodiments, the communication network 420 may be a Wi-Fi network operating on various frequency bands, such as, 2.4 GHZ, 5 GHz, or 6 GHz. In further embodiments, the traffic manager operating on the servers 410 can facilitate implementation of the QoS policies for the LAS data flows. The traffic manager can be provided as a cloud-based service that can service remote networks, such as, but not limited to a deployed network 440. In many embodiments, the traffic manager can be a logic that determines whether the data flows are L4S and applies the QoS policies for the L4S data flows.

However, in additional embodiments, the traffic manager may be operated as a distributed logic across multiple network devices. In the embodiment depicted in FIG. 4, a plurality of APs 450 can operate as the traffic manager in a distributed manner or may have one specific device operate as the traffic manager for all of the neighboring or sibling APs 450. The APs 450 facilitate Wi-Fi connections for various electronic devices, such as but not limited to mobile computing devices including laptop computers 470, cellular phones 460, portable tablet computers 480 and wearable computing devices 490.

In further embodiments, the traffic manager may be integrated within another network device. In the embodiment depicted in FIG. 4, a wireless LAN controller (WLC) 430 may have an integrated traffic manager that the WLC 430 can use to implement the QoS policies for the L4S data flows within the various APs 435 that the WLC 430 is connected to, either wired or wirelessly. In still more embodiments, a personal computer 425 may be utilized to access and/or manage various aspects of the traffic manager, either remotely or within the network itself. In the embodiment depicted in FIG. 4, the personal computer 425 communicates over the communication network 420 and can access the traffic manager of the servers 410, or the network APs 450, or the WLC 430.

Although a specific embodiment for various environments that the traffic manager may operate on a plurality of network devices suitable for carrying out the various steps, processes, methods, and operations described herein is discussed with respect to FIG. 4, any of a variety of systems and/or processes may be utilized in accordance with embodiments of the disclosure. In many non-limiting examples, the traffic manager may be provided as a device or software separate from the network devices or the traffic manager may be integrated into the network devices. The elements depicted in FIG. 4 may also be interchangeable with other elements of FIGS. 1-3 and 5-8 as required to realize a particularly desired embodiment.

Figure 5:
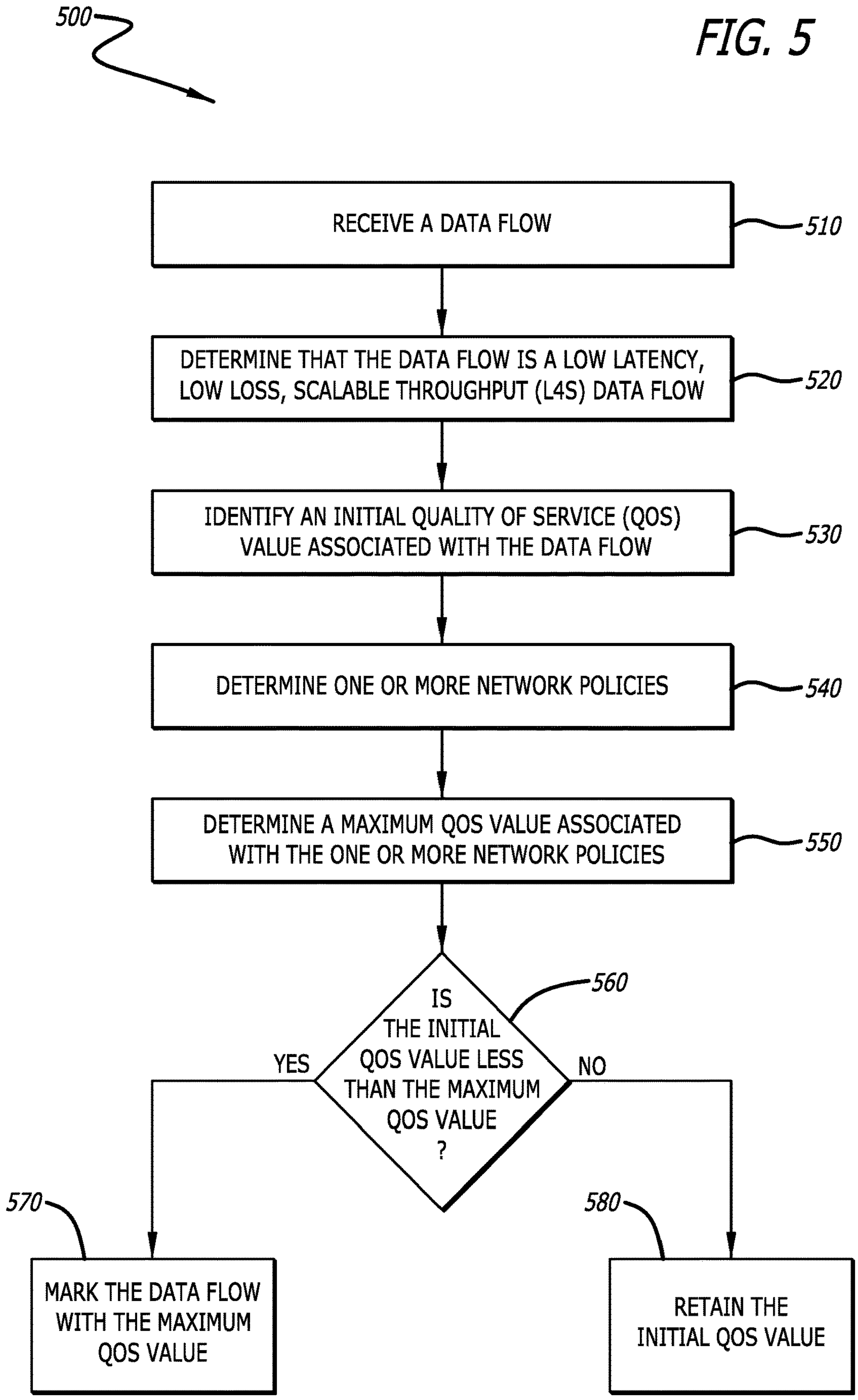
FIG. 5 is a flowchart depicting a process for assigning Quality of Service (QoS) values to Low Latency, Low Loss, and Scalable throughput (LAS) data flows, in accordance with various embodiments of the disclosure.

Referring now to FIG. 5, a flowchart depicting a process 500 for assigning the QoS values to the LAS data flows, in accordance with various embodiments of the disclosure is shown. In many embodiments, the process 500 may receive the data flow (block 510). In some embodiments, the data flow may be the upstream data flow initiated by the user device and received through Wi-Fi. In certain embodiments, the data flow can be the downstream data flow received from the endpoint through Ethernet. In more embodiments, the data flow may be indicative of real-time or near-real time communication such as multimedia, for example. In some more embodiments, the process 500 can be implemented by the AP or the WLC.

In a number of embodiments, the process 500 can determine that the data flow is LAS (block 520). In some embodiments, the process 500 may detect or identify the ECN indicator in the data flow. In certain embodiments, examples of the ECN indicators include but are not limited to, CE or ECT which can further include ECT(1) and/or ECT(0). In more embodiments, the process 500 can thereafter determine that the data flow is the LAS data flow based on the ECN indicator.

In various embodiments, the process 500 may identify the initial QoS value associated with the data flow (block 530). In some embodiments, the data flow can comprise one or more data packets. In numerous embodiments, each data packet may include corresponding initial header. In certain embodiments, the initial header may include the initial QoS value, such as but not limited to the initial DSCP value or the initial UP value associated with the data flow.

In additional embodiments, the process 500 can determine one or more network policies (block 540). In some embodiments, the one or more network policies may include the QoS policies. In certain embodiments, the one or more QoS policies may define traffic classification, priority levels, bandwidth allocation, traffic policing and shaping, redirection and forwarding, or congestion management, etc. for example. In more embodiments, the one or more network policies may include the one or more metal policies, such as but not limited to gold, silver, or bronze, for example.

In further embodiments, the process 500 may determine the maximum QoS value associated with the one or more network policies (block 550). In some embodiments, the QoS policies may include QoS ceiling values, such as but not limited to, the maximum DSCP values, the maximum UP values, or the TID values, for example. In certain embodiments, these QoS ceiling values may indicate the highest QoS level or the maximum QoS value for the data flows. In more embodiments, for example, the DSCP ceiling value may be set to prioritize certain types of the traffic based on corresponding DSCP values, or the UP/TID ceilings values can be set to control the priority of the traffic based on corresponding user priority or traffic identifiers.

In many more embodiments, the process 500 can compare the initial QoS value with the maximum QoS value to determine whether the initial QoS value is less than the maximum QoS value (block 560). In some embodiments, the initial DSCP value of the data flow may be compared with the maximum DSCP value associated with the highest QoS level. In certain embodiments, the initial DSCP value can be compared with one or more DSCP ceiling values associated with the metal policies. In some more embodiments, the process 500 may map the data flow to at least one of: the UP value or the AC value based on a result of the comparison. In many more embodiments, for example, the UP value or the AC value is indicative of one or more of: AC Voice (AC_VO), AC Video (AC_VI) or AC Best Effort (AC_BE).

In many additional embodiments, if the process 500 determines that the initial QoS value is less than the maximum QoS value, the process 500 may mark the data flow with the maximum QoS value (block 570). In some embodiments, the process 500 can encapsulate the data packet to generate the encapsulated data packet. In certain embodiments, the encapsulated data packet may include the outer header indicative of the maximum QoS value, for example, the maximum DSCP value or the DSCP ceiling value.

In many further embodiments, if the process 500 determines that the initial QoS value is greater than or equal to the maximum QoS value, the process 500 may retain the maximum QoS value in the initial header and the outer header (block 580). In some embodiments, the process 500 can implement the LAS exception, wherein the process 500 may allow the data packet to maintain the initial DSCP value, which may be higher than the DSCP ceiling value, as the exception to the QoS policies. In certain embodiments, the process 500 can ensure that the L4S data flows may have the QoS values equal to or greater than the QoS ceiling values to ensure effective LAS treatment for the L4S data flows.

Although a specific embodiment for the process 500 for assigning the QoS values to the LAS data flows for carrying out the various steps, processes, methods, and operations described herein is discussed with respect to FIG. 5, any of a variety of systems and/or processes may be utilized in accordance with embodiments of the disclosure. For example, the process 500 may dynamically reassign the QoS values to the L4S data flows. The elements depicted in FIG. 5 may also be interchangeable with other elements of FIGS. 1-4 and FIGS. 6-8 as required to realize a particularly desired embodiment.

Figure 6:
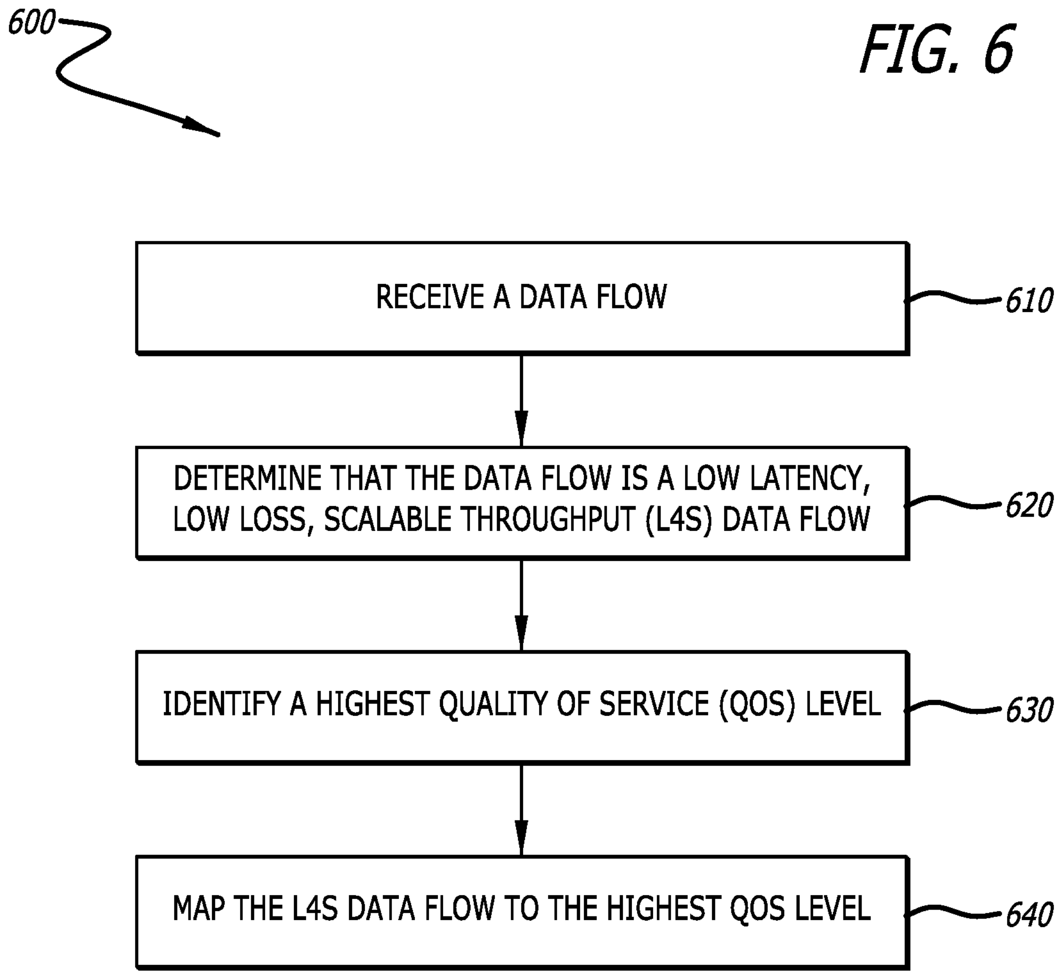
FIG. 6 is a flowchart depicting a process for mapping the LAS data flows, in accordance with various embodiments of the disclosure.

Referring now to FIG. 6, a flowchart depicting a process 600 for mapping the L4S data flows, in accordance with various embodiments of the disclosure is shown. In many embodiments, the process 600 can receive the data flow (block 610). In some embodiments, the data flow may be the upstream data flow initiated by the user device and received through Wi-Fi. In certain embodiments, the data flow can be the downstream data flow received from the endpoint through Ethernet. In more embodiments, the data flow may be indicative of the real-time or near-real time communication such as multimedia, for example. In some more embodiments, the process 600 can be implemented by the AP or the WLC.

In a number of embodiments, the process 600 can determine that the data flow is LAS (block 620). In some embodiments, the process 600 may detect or identify the ECN indicator in the data flow. In certain embodiments, examples of the ECN indicators include but are not limited to, CE or ECT. In more embodiments, the process 600 can thereafter determine that the data flow is the LAS data flow based on the ECN indicator.

In various embodiments, the process 600 may identify the highest QoS level (block 630). In some embodiments, the process 600 can be configured with the QoS policies. In some embodiments, the QoS policies may include the one or more metal policies, such as but not limited to gold, silver, or bronze, for example. In certain embodiments, the QoS policies may include the QoS ceiling values, such as but not limited to, the maximum DSCP values, the maximum UP values, or the TID values, for example. In more embodiments, these QoS ceiling values may indicate the highest QoS level or the maximum QoS value for the data flows.

In additional embodiments, the process 600 can map the data flow to the highest QoS level (block 640). In some embodiments, the process 600 may encapsulate the data packet to generate the encapsulated data packet. In certain embodiments, the encapsulated data packet may include the outer header indicative of the maximum QoS value, for example, the maximum DSCP value or the DSCP ceiling value, thereby mapping the data flow to the highest QoS level.

Although a specific embodiment for the process 600 for mapping the L4S data flows for carrying out the various steps, processes, methods, and operations described herein is discussed with respect to FIG. 6, any of a variety of systems and/or processes may be utilized in accordance with embodiments of the disclosure. For example, the process 600 may dynamically map the identified LAS data flows to the highest QoS level. The elements depicted in FIG. 6 may also be interchangeable with other elements of FIGS. 1-5 and FIGS. 7-8 as required to realize a particularly desired embodiment.

Figure 7:
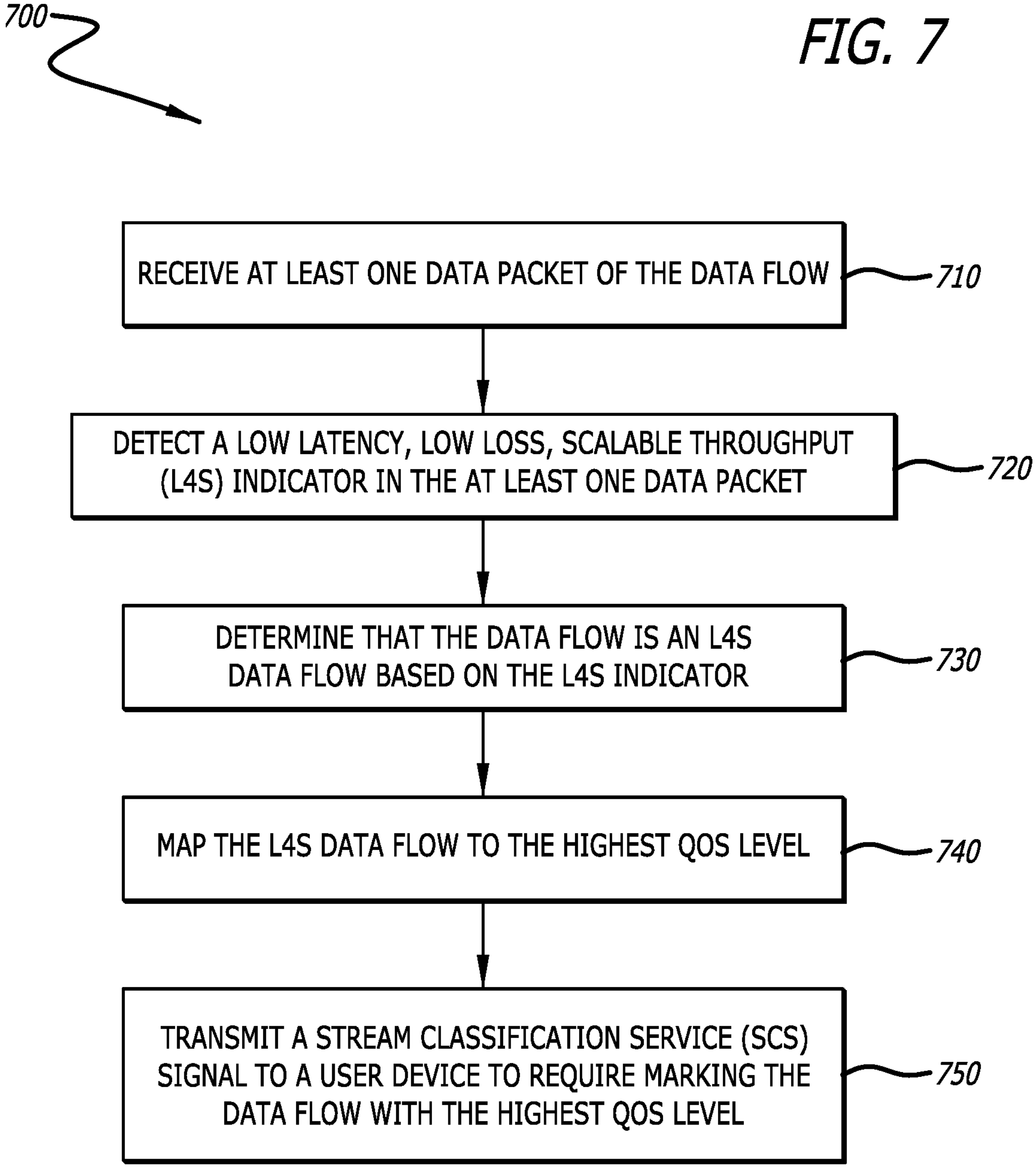
FIG. 7 is a flowchart depicting a process for a Stream Classification Service (SCS) signaling, in accordance with various embodiments of the disclosure.

Referring now to FIG. 7, a flowchart depicting a process 700 for a Stream Classification Service (SCS) signaling, in accordance with various embodiments of the disclosure is shown. In many embodiments, the process 700 may receive the data packet in the data flow that is not marked as LAS (block 710). In some embodiments, the data flow may be the upstream data flow initiated by the user device and received through Wi-Fi. In certain embodiments, the process 700 can be implemented by the AP.

In a number of embodiments, the process 700 may detect an LAS indicator in the data packet (block 720). In some embodiments, the L4S indicator maybe a congestion indicator. In certain embodiments, the LAS indicator may indicate LAS capability of the endpoints, including the user device or the server in communication with the user device. In certain embodiments, the L4S indicator may indicate that the data flow is a latency sensitive data flow. In more embodiments, the L4S indicator may indicate that the data flow is a high priority data flow.

In various embodiments, the process 700 can determine that the data flow is LAS based on the LAS indicator (block 730). In some embodiments, the process 700 may detect or identify the ECN indicator in the data flow. In certain embodiments, examples of the ECN indicators include but are not limited to, CE or ECT. In more embodiments, the process 700 can thereafter determine that the data flow is the L4S data flow based on the ECN indicator.

In additional embodiments, the process 700 may map the L4S data flow to the highest QoS level (block 740). In that, in some embodiments, the process 700 can identify the highest QoS level associated with the LAS data flows. In certain embodiments, the process 700 may determine the DSCP ceiling value associated with the highest QoS level. In more embodiments, the process 700 can assign the DSCP ceiling value to the data flow, thereby mapping the L4S data flow to the highest QoS level.

In further embodiments, the process 700 can transmit the SCS signal to the user device (block 750). In some embodiments, the SCS signal may be indicative of overriding the initially assigned DSCP or UP values. In certain embodiments, the SCS signal can be indicative of requiring the user device to mark the data flow with the DSCP ceiling value. In more embodiments, in response to the SCS signal, for example, the user device may mark the data flow with the DSCP ceiling value. In some more embodiments, for example, the process 700 can thereafter enqueue the upstream LAS data flow into the L4S queue having lowest latency.

Although a specific embodiment for the process 700 for the SCS signaling for carrying out the various steps, processes, methods, and operations described herein is discussed with respect to FIG. 7, any of a variety of systems and/or processes may be utilized in accordance with embodiments of the disclosure. For example, the process 700 may dynamically require the user device to override the initial QoS value. The elements depicted in FIG. 7 may also be interchangeable with other elements of FIGS. 1-6 and FIG. 8 as required to realize a particularly desired embodiment.

Figure 8:
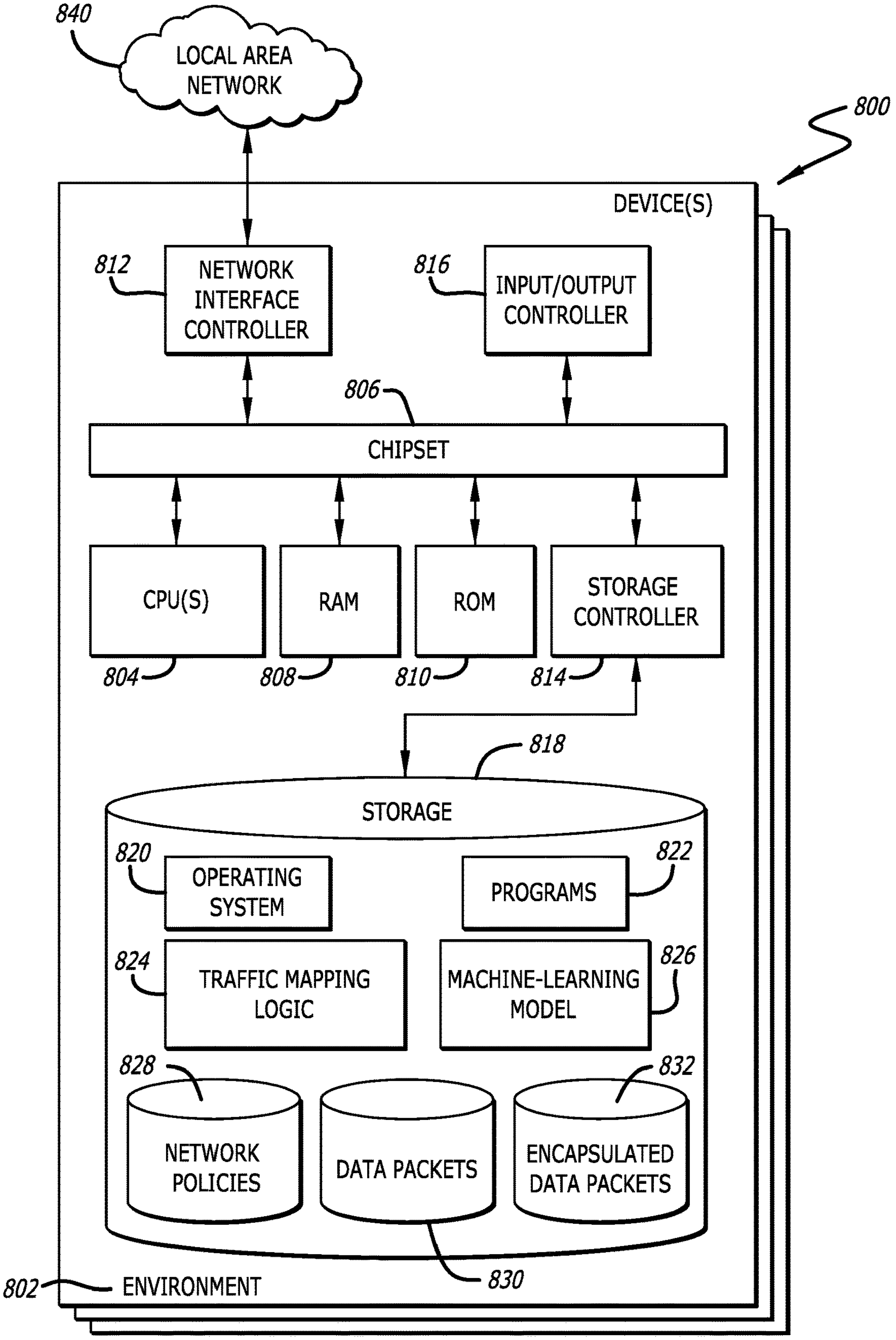
FIG. 8 is a conceptual block diagram of a device suitable for configuration with a traffic mapping logic, in accordance with various embodiments of the disclosure.

Referring to FIG. 8, a conceptual block diagram of a device 800 suitable for configuration with a traffic mapping logic, in accordance with various embodiments of the disclosure is shown. The embodiment of the conceptual block diagram depicted in FIG. 8 can illustrate a conventional server, computer, workstation, desktop computer, laptop, tablet, network appliance, e-reader, smartphone, or other computing device, and can be utilized to execute any of the application and/or logic components presented herein. The embodiment of the conceptual block diagram depicted in FIG. 8 can also illustrate an access point, a switch, or a router in accordance with various embodiments of the disclosure. The device 800 may, in many non-limiting examples, correspond to physical devices or to virtual resources described herein.

In many embodiments, the device 800 may include an environment 802 such as a baseboard or "motherboard," in physical embodiments that can be configured as a printed circuit board with a multitude of components or devices connected by way of a system bus or other electrical communication paths. Conceptually, in virtualized embodiments, the environment 802 may be a virtual environment that encompasses and executes the remaining components and resources of the device 800. In more embodiments, one or more processors 804, such as, but not limited to, central processing units ("CPUs") can be configured to operate in conjunction with a chipset 806. The processor(s) 804 can be standard programmable CPUs that perform arithmetic and logical operations necessary for the operation of the device 800.

In a number of embodiments, the processor(s) 804 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In various embodiments, the chipset 806 may provide an interface between the processor(s) 804 and the remainder of the components and devices within the environment 802. The chipset 806 can provide an interface to a random-access memory ("RAM") 808, which can be used as the main memory in the device 800 in some embodiments. The chipset 806 can further be configured to provide an interface to a computer-readable storage medium such as a read-only memory ("ROM") 810 or non-volatile RAM ("NVRAM") for storing basic routines that can help with various tasks such as, but not limited to, starting up the device 800 and/or transferring information between the various components and devices. The ROM 810 or NVRAM can also store other application components necessary for the operation of the device 800 in accordance with various embodiments described herein.

Additional embodiments of the device 800 can be configured to operate in a networked environment using logical connections to remote computing devices and computer systems through a network, such as the network 840. The chipset 806 can include functionality for providing network connectivity through a network interface card ("NIC") 812, which may comprise a gigabit Ethernet adapter or similar component. The NIC 812 can be capable of connecting the device 800 to other devices over the network 840. It is contemplated that multiple NICs 812 may be present in the device 800, connecting the device to other types of networks and remote systems.

In further embodiments, the device 800 can be connected to a storage 818 that provides non-volatile storage for data accessible by the device 800. The storage 818 can, for instance, store an operating system 820, applications 822, network policies 828, data packets 830, and encapsulated data packets 832 which are described in greater detail below. The storage 818 can be connected to the environment 802 through a storage controller 814 connected to the chipset 806. In certain embodiments, the storage 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units. The network policies 828 may store the one or more QoS policies. The data packets 830 may be the one or more data packets in the data flow received by the device 800. The encapsulated data packets 832 can be the one or more encapsulated data packets generated by the device 800.

The device 800 can store data within the storage 818 by transforming the physical state of the physical storage units to reflect the information being stored. The specific transformation of physical state can depend on various factors. Examples of such factors can include, but are not limited to, the technology used to implement the physical storage units, whether the storage 818 is characterized as primary or secondary storage, and the like.

In many more embodiments, the device 800 can store information within the storage 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 800 can further read or access information from the storage 818 by detecting the physical states or characteristics of one or more particular locations within the physical storage units.

In addition to the storage 818 described above, the device 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 800. In some examples, the operations performed by a cloud computing network, and or any components included therein, may be supported by one or more devices similar to device 800. Stated otherwise, some or all of the operations performed by the cloud computing network, and or any components included therein, may be performed by one or more devices 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 818 can store an operating system 820 utilized to control the operation of the device 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 818 can store other system or application programs and data utilized by the device 800.

In many additional embodiments, the storage 818 or other computer-readable storage media is encoded with computer-executable instructions which, when loaded into the device 800, may transform it from a general-purpose computing system into a special-purpose computer capable of implementing the embodiments described herein. These computer-executable instructions may be stored as application 822 and transform the device 800 by specifying how the processor(s) 804 can transition between states, as described above. In some embodiments, the device 800 has access to computer-readable storage media storing computer-executable instructions which, when executed by the device 800, perform the various processes described above with regard to FIGS. 1-7. In certain embodiments, the device 800 can also include computer-readable storage media having instructions stored thereupon for performing any of the other computer-implemented operations described herein.

In many further embodiments, the device 800 may include a traffic mapping logic 824. The traffic mapping logic 824 can be configured to perform one or more of the various steps, processes, operations, and/or other methods that are described above. Often, the traffic mapping logic 824 can be a set of instructions stored within a non-volatile memory that, when executed by the processor(s)/controller(s) 804 can carry out these steps, etc. In some embodiments, the traffic mapping logic 824 may be a client application that resides on a network-connected device, such as, but not limited to, a server, switch, personal or mobile computing device in a single or distributed arrangement. The traffic mapping logic 824 can implement the QoS policies associated with the LAS data flows.

In still further embodiments, the device 800 can also include one or more input/output controllers 816 for receiving and processing input from a number of input devices, such as a keyboard, a mouse, a touchpad, a touch screen, an electronic stylus, or other type of input device. Similarly, an input/output controller 816 can be configured to provide output to a display, such as a computer monitor, a flat panel display, a digital projector, a printer, or other type of output device. Those skilled in the art will recognize that the device 800 might not include all of the components shown in FIG. 8 and can include other components that are not explicitly shown in FIG. 8 or might utilize an architecture completely different than that shown in FIG. 8.

As described above, the device 800 may support a virtualization layer, such as one or more virtual resources executing on the device 800. In some examples, the virtualization layer may be supported by a hypervisor that provides one or more virtual machines running on the device 800 to perform functions described herein. The virtualization layer may generally support a virtual resource that performs at least a portion of the techniques described herein.

Finally, in numerous additional embodiments, data may be processed into a format usable by a machine-learning model 826 (e.g., feature vectors), and or other pre-processing techniques. The machine-learning ("ML") model 826 may be any type of ML model, such as supervised models, reinforcement models, and/or unsupervised models. The ML model 826 may include one or more of linear regression models, logistic regression models, decision trees, Naïve Bayes models, neural networks, k-means cluster models, random forest models, and/or other types of ML models 826.

The ML model(s) 826 can be configured to generate inferences to make predictions or draw conclusions from data. An inference can be considered the output of a process of applying a model to new data. This can occur by learning from at least the network policies 828, the data packets 830, and the encapsulated data packets 832 and use that learning to predict future outcomes. These predictions are based on patterns and relationships discovered within the data. To generate an inference, the trained model can take input data and produce a prediction or a decision. The input data can be in various forms, such as images, audio, text, or numerical data, depending on the type of problem the model was trained to solve. The output of the model can also vary depending on the problem, and can be a single number, a probability distribution, a set of labels, a decision about an action to take, etc. Ground truth for the ML model(s) 826 may be generated by human/administrator verifications or may compare predicted outcomes with actual outcomes.

Although a specific embodiment for the device 800 suitable for configuration with the traffic mapping logic for carrying out the various steps, processes, methods, and operations described herein is discussed with respect to FIG. 8, any of a variety of systems and/or processes may be utilized in accordance with embodiments of the disclosure. For example, the device 800 may be in a virtual environment such as a cloud-based network administration suite, or it may be distributed across a variety of network devices or switches. The elements depicted in FIG. 8 may also be interchangeable with other elements of FIGS. 1-7 as required to realize a particularly desired embodiment.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A device, comprising:
- a processor;
- a memory communicatively coupled to the processor; and
- a traffic mapping logic, configured to:
  - receive a data flow including at least one data packet;
  - determine that the data flow is a Low Latency, Low Loss, Scalable throughput (L4S) data flow;
  - identify an initial Quality of Service (QoS) value in at least one initial header of the at least one data packet;
  - determine one or more network policies associated with the LAS data flow;
  - map one of the at least one data packet based on the initial QoS value and the one or more network policies;
  - determine a DSCP ceiling value associated with a highest QoS level; and
  - assign the DSCP ceiling value to the data flow.

2. The device of claim 1, wherein mapping each of the at least one data packet comprises:
- determining a maximum QoS value associated with the one or more network policies;
- comparing the initial QoS value with the maximum QoS value;
- generating at least one encapsulated data packet including at least one outer header based on a result of the comparison; and
- mapping the data flow to at least one of: a User Priority (UP) value or an Access Category (AC) value based on a result of the comparison.

3. The device of claim 2, wherein the at least one outer header is indicative of the initial QoS value if the initial QoS value is greater than or equal to the maximum QoS value.

4. The device of claim 2, wherein the at least one outer header is indicative of the maximum QoS value if the initial QoS value is less than the maximum QoS value.

5. The device of claim 2, wherein the traffic mapping logic is further configured to replace the initial QoS value in the at least one initial header with the maximum QoS value if the initial QoS value is less than the maximum QoS value.

6. The device of claim 2, wherein the initial QoS value and the maximum QoS value are indicative of an initial Differentiated Services Code Point (DSCP) value and a maximum DSCP value respectively.

7. The device of claim 6, wherein the UP value or the AC value is indicative of one or more of: AC Voice (AC_VO), AC Video (AC_VI) or AC Best Effort (AC_BE).

8. The device of claim 2, wherein determining that the data flow is the LAS data flow comprises:
- detecting an L4S indicator in the at least one data packet; and
- determining that the data flow is the L4S data flow based on the L4S indicator.

9. The device of claim 8, wherein the L4S indicator includes an Explicit Congestion Notification (ECN) indicator.

10. The device of claim 8, wherein the traffic mapping logic is further configured to enqueue the L4S data flow into an LAS queue.

11. A device, comprising:
- a processor;
- a memory communicatively coupled to the processor; and
- a traffic mapping logic, configured to:
  - receive a data flow;
  - determine that the data flow is a Low Latency, Low Loss, Scalable throughput (L4S) data flow;
  - identify a highest Quality of Service (QoS) level if the data flow is the L4S data flow;
  - map the L4S data flow to a highest QoS level;
  - determine a DSCP ceiling value associated with a highest QoS level; and
  - assign the DSCP ceiling value to the data flow.

12. The device of claim 11, wherein the traffic mapping logic is further configured to enqueue the L4S data flow into a queue associated with a highest QoS level.

13. The device of claim 11, wherein determining that the data flow is the L4S data flow comprises:
- receiving at least one data packet of the data flow;
- detecting an LAS indicator in the at least one data packet; and
- determining that the data flow is the L4S data flow based on the L4S indicator.

14. The device of claim 13, wherein the traffic mapping logic is further configured to generate at least one encapsulated data packet including at least one outer header indicative of a highest QoS level.

15. The device of claim 13, wherein the L4S indicator includes an Explicit Congestion Notification (ECN) indicator.

16. The device of claim 13, wherein the data flow is an upstream data flow received from a wireless device.

17. The device of claim 16, wherein the traffic mapping logic is further configured to transmit, to the wireless device, a Stream Classification Service (SCS) signal indicative of marking the upstream data flow with a highest QoS level.

18. A method, comprising:
- receiving a data flow including at least one data packet;
- determining that the data flow is a Low Latency, Low Loss, Scalable throughput (LAS) data flow;
- identifying an initial Quality of Service (QoS) value in at least one initial header of the at least one data packet;
- determining one or more network policies associated with the L4S data flow;
- determining a maximum QoS value associated with the one or more network policies;

generating at least one encapsulated data packet including at least one outer header based on the initial QoS value and the maximum QoS value;

determining a DSCP ceiling value associated with a highest QoS level; and assigning the DSCP ceiling value to the data flow.

19. The method of claim 18, wherein the at least one outer header is indicative of the initial QoS value if the initial QoS value is greater than or equal to the maximum QoS value.

20. The method of claim 18, wherein the at least one outer header is indicative of the maximum QoS value if the initial QoS value is less than the maximum QoS value.

* * * * *